United States Patent [19]

Stover

[11] 4,201,611
[45] May 6, 1980

[54] CARBON/CARBON COMPOSITE FOR RE-ENTRY VEHICLE APPLICATIONS

[75] Inventor: Edward R. Stover, Wayne, Pa.

[73] Assignee: The United States of America as represented by the Secretary of the Air Force, Washington, D.C.

[21] Appl. No.: 896,861

[22] Filed: Apr. 17, 1978

[51] Int. Cl.² ............... B32B 5/12; B32B 31/26; B32B 33/00; B64G 1/30
[52] U.S. Cl. ..................... 156/155; 102/105; 156/272; 156/296; 239/265.11; 427/249; 427/296; 427/379; 428/113; 428/332; 428/337; 428/368; 428/401; 428/902; 264/29.5
[58] Field of Search ............... 102/105; 156/82, 155, 156/180, 272, 296; 239/265.11; 427/224, 249, 296, 380, 381, 379; 428/113, 332, 337, 368, 401, 902; 264/29.5

[56] References Cited

U.S. PATENT DOCUMENTS

| | | | |
|---|---|---|---|
| 3,578,030 | 5/1971 | Hatch | 138/141 |
| 3,603,260 | 9/1971 | Johnson | 102/105 |
| 3,616,140 | 10/1971 | Copeland et al. | 102/105 X |
| 3,639,159 | 2/1972 | Rose et al. | 102/105 X |
| 3,725,282 | 4/1973 | Weinberg | 252/62 |
| 3,853,600 | 12/1974 | Hou | 428/401 X |
| 3,949,126 | 4/1976 | Crawford | 428/113 |
| 4,103,055 | 7/1978 | Levy | 428/902 X |

Primary Examiner—John T. Goolkasian
Assistant Examiner—Robert A. Dawson
Attorney, Agent, or Firm—Joseph E. Rusz; William J. O'Brien

[57] ABSTRACT

A fine textured, high density, three directional, carbon-carbon fiber composite material with an axially to laterally oriented fiber ratio of 1.5 to 1 or higher and a density of 185 g/cm³ or higher.

1 Claim, 2 Drawing Figures

CARBON/CARBON COMPOSITE FOR RE-ENTRY VEHICLE APPLICATIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to an ablative material for use in the fabrication of nose tips for re-entry vehicles and to a method for its manufacture. More particularly, this invention relates to a fine textured, three-dimensional, reinforced carbon-carbon composite nose tip material having an improved shape stability in ablation/erosion environments and improved mechanical properties in comparison with presently known nose tip materials.

Recent advances in the field of aerospace technology have created a need for high strength, temperature resistant materials that possess the necessary properties needed to protect re-entry vehicles from the severe temperatures encountered within their re-entry environment. Re-entry vehicles are especially vulnerable to the stress and strain induced by their re-entry environment and require shapestable nose tips capable of surviving those stresses. Existing carbon-carbon materials have proven somewhat effective as materials for nose tip application and show adequate thermal stress performance. Unfortunately, however, these materials are deficient in mechanical strength and show unpredicted anomalies in their ablation characteristics.

With the present invention, however, it has been found that re-entry vehicle nose tips having superior re-entry performance characteristics in combination with high mechanical strength can be fabricated from a three dimensional fine textured carbon-carbon composite produced in accordance with this invention. The fiber ratio of the 3-D composite material in different directions was adjusted to provide higher transverse and shear reinforcement than in standard 3-D materials known heretofore. The adjustment of the axial or "Z" direction versus the lateral or "X" or "Y" direction provides an unexpected flexibility that makes the material especially useful in shell as well as plug nose constructions.

SUMMARY OF THE INVENTION

In accordance with this invention, it has been discovered that a finely textured, three dimensional carbon-carbon composite having particular characteristics is especially useful in the fabrication of nose-tips for re-entry vehicles because of its combined high mechanical strength and resistance to the degradative effect of the high temperatures found within a re-entry environment. The particular material of this invention is characterized by having 3 ends of Thornel 50 high modulus graphite yarn in each axial "Z" bundle placed on 0.030 inch centers in a 3-D orthogonal lattice, with 2 ends of Thornel 50 in each lateral "X" and "Y" bundle spaced 0.030–0.035 (0.033 nominal) inches along the length. This reinforced composite is then processed to a high density in accordance with the method of this invention which includes the steps of heating, CVD infiltrating, coal tar pitch impregnating, baking at high pressures (about 15,000 psi) and then graphitizing. Thornel 50 is a commercially available graphite yarn from the Union Carbide Co. Other high modulus graphite yarn having similar yarn cross section (as measured by dividing weight per unit length by density) may also be used. For example, Hercules "HM 3000" may be used in place of 3 strands of thornel 50 in the Z direction, and two strands of "HM 1000" may be used in place of two ends of thornel 50 in the X and Y directions without modifying the material geometry.

Accordingly, the primary object of this invention is to provide an improved 3-D carbon-carbon composite that is fine textured and characterized by a combination of high mechanical strength and high thermal resistance.

Another object of the present invention is to provide a protective material for re-entry vehicle nose cones.

Still another object of this invention is to provide re-entry vehicle nose-tips having improved shape stability in ablation/erosion environments and improved mechanical strength properties as compared to existing nose tip materials.

The above and still other objects and advantages of the present invention will become more readily apparent upon consideration of the following detailed description thereof when taken in conjunction with the accompanying drawings.

DESCRIPTION OF THE PREFERRED EMBODIMENT

Pursuant to the above objects, the present invention contemplates the fabrication of a high density, fine textured carbon-carbon composite material particularly adapted for use in the fabrication of nose tips for re-entry vehicles.

The use of graphite fiber composite materials for re-entry applications is well known. Carbon-Carbon composites have been prepared with either high modulus or low modulus graphite fiber bundles oriented in several directions in three dimensions. A reinforcement geometry with a 3-dimensional orthogonal structure was found to be useful. However, fiber bundles processed in accordance with the prior art lacked the necessary combination of mechanical strength and elevated temperature resistance required for use as a nose tip material subject to the stresses encountered within a re-entry environment. Re-entry vehicles require stable nose tips capable of surviving the thermal stress and loads induced by a re-entry environment. Previous carbon-carbon materials have shown adequate thermal stress performance, but have been deficient in mechanical strength for bending loads in nose-tip designs and they show unpredicted anomalies in ablation during test.

Figure 1:
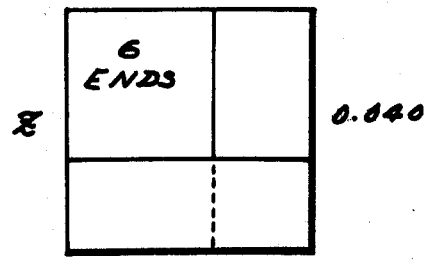
FIG. 1 represents a schematic illustration showing a sectioned structure of a carbon-carbon composite.
Figure 1:
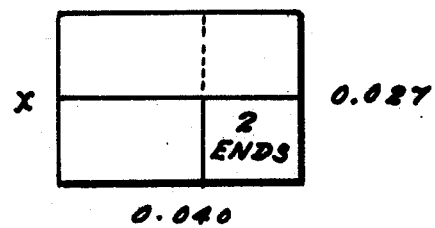
Figure 2:
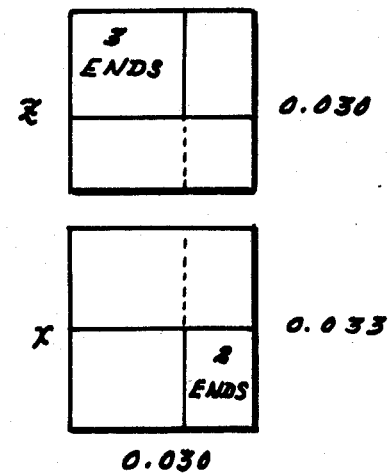
FIG. 2 represents a schematic illustration showing a sectioned structure of the carbon-carbon composite of this invention. An equivalent construction, also embodied in this invention, may contain only one end of Thornel 50 (or HM 1000) in the X and Y directions in which case, the unit cell has one-half of the dimension shown in the Z direction (0.0176" instead of 0.033 in.).

The carbon-carbon material prepared in accordance with this invention, however, provides nose-tips which have improved shape stability for ablation applications and improved mechanical strength properties. FIG. 1 of the drawing discloses a prior art graphite composite structured to have 6 ends of graphite fibers in each axial "Z" bundle placed on 0.040 inch centers with 2 ends of graphite fibers in each lateral "X" and "Y" bundle spaced 0.027 inches along the length. FIG. 2, on the other hand, shows the structural configuration of the graphite fiber composite contemplated by this invention. As can be seen, it possesses the following characteristics. Three ends of graphite fibers in each axial "Z" bundle placed on 0.030 inch centers in a 3-D orthogonal lattice with two ends of graphite fibers in each lateral "X" and "Y" bundle spaced 0.033 inches along the length with 28 to 32 rows per inch of length. Lateral spacing may be from 0.030 to 0.035 inches, if desired. Thornel 50, a commercially available graphite yarn from Union Carbide Company, may be used for the graphite fibers of this invention. Other high modulus graphite yarns, having similar cross sectional areas, may be used, for example, Hercules Corp "HM 3000" (like 3 ends of Thornel 50 in area) and "HM 1000" (like one end of Thornel 50, in area) without changing the geometry.

After preparing the high axially oriented structure referred to above, the structure is then processed to a high density (1.85 g/cm$^3$ or above) in accordance with the following procedure. A 4"×8"×4" billet of the composite is heated in vacuum to a temperature of 1500° C. to remove the PVA coating found in the commercially available fibers. CVD infiltration is then conducted by heating in an atmosphere containing methane at 0.001 to 0.003 atm. pressure for a total of 80 hours at a temperature of 1050°–1100° C. to apply approximately one micron coating thickness on the fibers. The billet is then impregnated with coal tar pitch, placed in an autoclave and heated to 250° C. The pressure is raised to 15,000 psi and temperature is raised to 650° C. at 15,000 psi pressure. Following this procedure, the billet is then graphitized at 1 atm. pressure to 2700° C. This processing cycle is then repeated 3 or 4 times for a total processing cyle of 4 or 5 cycles.

When first conducted, on 4 such billets processsed simultaneously, the resulting 3-directional, orthogonal, reinforced graphite composite possessed a fine-grained texture and a high axial orientation with a Z/X ratio (axial/lateral) of approximately 1.5/1 or above. The material possesses superior re-entry performance characteristics combined with mechanical strength in the transverse direction, thus providing an improved margin of safety for nose-tip structures. Also, it possesses a higher shear reinforcement than previously known three-directional graphite composites, thus providing flexibility, for use in shell as well as plug nose constructions.

Although the invention has been described with reference to a specific embodiment thereof, it is to be understood that the modifications and alterations encompassed within the appended claims are intended to be included herein.

What is claimed is:

1. A method for fabricating a re-entry vehicle nose-tip material which comprises the steps of
   (a) forming a billet of a three directional carbon-carbon material having a plurality of graphite bundles oriented in an axial "Z" direction and in a lateral "X" or "Y" direction, said axially oriented bundles each having three ends of graphite yarn with 0.030 in spacing between axial bundles and said laterally oriented bundles each having two ends of graphite yarn with 0.030 to 0.035 inches along the length;
   (b) heating said billet within a vacuum to a temperature of about 1500° C. to clean the surfaces of the fibers;
   (c) infiltrating said heated billet with carbon by passing said billet through an r.f. coil while heating at 0.001–0.003 atm. pressure in an atmosphere containing methane gas;
   (d) impregnating said infiltrated billet with coal tar pitch at a temperature of 250° C. and a pressure of 15,000 psi;
   (e) baking said impregnated billet at pressure and a temperature of approximately 650° C.;
   (f) graphitizing said baked billet at one atmospheric pressure to 2700° C.; and
   (g) repeating in sequence the cycle of steps (b) through (f) for from three to four times, thus forming a high density carbon-carbon composite.

* * * * *